Dec. 3, 1929.    F. N. CAMPBELL ET AL    1,738,229
GLASS CUTTING.
Filed Dec. 10, 1928
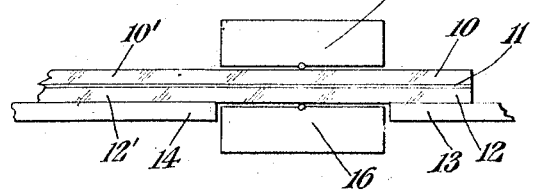
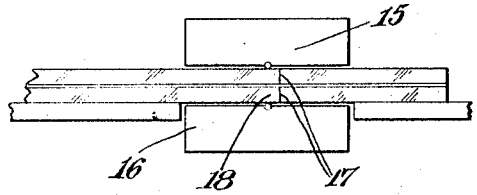
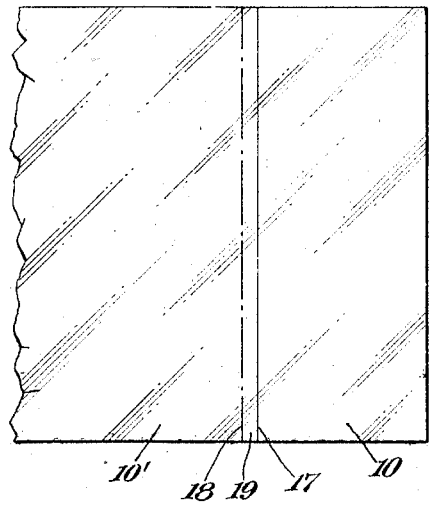
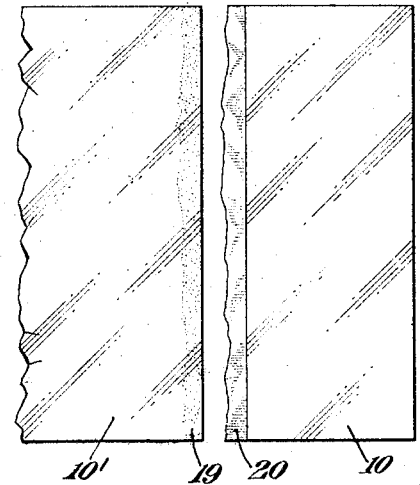
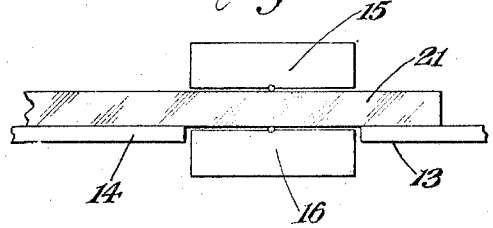
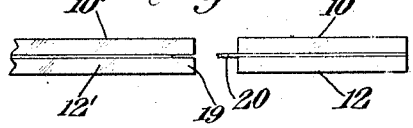
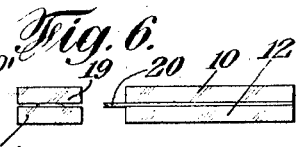
INVENTORS
Furman N. Campbell
Jules Myatt
BY Ward & Crosby
their ATTORNEYS Patented Dec. 3, 1929

1,738,229

UNITED STATES PATENT OFFICE

FURMAN N. CAMPBELL, OF NEW HAVEN, AND JULES MYATT, OF EAST HAVEN, CONNECTICUT, ASSIGNORS TO BESSIE L. GREGG, OF FOREST HILL GARDENS, NEW YORK

GLASS CUTTING

Application filed December 10, 1928. Serial No. 325,121.

This invention relates to processes and apparatus for severing and trimming glass and according to one phase of the invention the same is particularly adapted for cutting or severing laminated glass comprising a plurality of layers of glass between which layers of cellulosic or gelatinous material are placed to prevent shattering, etc.

Heretofore it has been impossible to sever or trim such laminated glass accurately or economically after the laminations have been secured together. The difficulties in cutting or trimming such glass are encountered by reason of the widely different characteristics of the glass and the material for preventing shattering. That is, any ordinary means which will crack or sever the glass is not suited for severing the cellulosic material. Vice versa, any medium for softening or cutting the cellulosic material interferes with the cutting of the glass.

In addition to the cutting of laminated glass, certain features of this invention are applicable to the cutting of single layers of glass.

Various further and also various more specific objects, features and advantages will clearly appear from the detailed description given below taken in connection with the accompanying drawings which form a part of this specification and illustrate, merely by way of example, one embodiment of the invention.

According to one embodiment of the present invention, the two sheets of glass at the opposite sides of the cellulosic lamination may be first cracked along the desired line of separation successively or simultaneously by a suitable process, such for example as that disclosed in our Patents Nos. 1,720,883 and 1,719,588, and in our copending application Ser. No. 223,864. However, according to certain phases of the invention, other cracking methods might be used, such for example as the well known use of a diamond or steel wheel.

After this cracking operation, the glass at one side of the line of separation is preferably heated to a suitable temperature to soften or to an extent to reduce the adhesion of the layer of cellulosic or like material and the adjoining glass surfaces, whereby within a limited zone at least along one side of the line of separation, the adhesion of the cellulosic material to the glass has loosened, or the cellulosic material becomes relatively plastic. Thereafter the area of glass at the side of the line of separation which has not been heated, may be fixed on a suitable stationary support while a force is applied to the area of glass at the other side of the line of separation, so as to draw the latter area apart from the stationary area. Such force may be preferably applied in a direction substantially perpendicular to the line of separation and along the plane of the glass. Under certain circumstances it may be found desirable to retain the heated area of glass in a stationary position while the relatively unheated area is drawn away therefrom.

By following out this process, it will be found that the cellulosic material along a zone adjacent the line of separation and at the side which has been heated, will be pulled free of the heated areas of glass and will adhere to the edge of the unheated section, thus leaving the cellulosic material at the edge of the unheated section free of any irregularities or torn out portions. The protruding or exposed edge or zone of cellulosic material may be readily trimmed off or eliminated by suitable cutting or melting means.

In Fig. 1 a layer of laminated glass is indicated comprising a top glass layer 10, 10', an intermediate layer of cellulosic or other binding material 11, and a bottom layer of glass 12, 12'. The glass is shown supported on a pair of spaced supports 13 and 14, which may be of the type disclosed in our copending applications above referred to. A pair of electrical cutting devices are indicated at 15 and 16, arranged along the desired line of separation respectively at the top and bottom surfaces of the laminated glass. These cutting devices may comprise suitable electrically heated elements, various forms of which are disclosed in our said copending applications.

Upon operation of the devices 15 and 16, the layers of glass may be cracked or severed accurately on the desired line as indicated at 17 of Fig. 2, whereupon the relative positions of the glass and the cutting means may be moved, for example, as shown in Fig. 2, so that the heating devices of the cutting mechanism may heat the area of glass at one side of the line of separation at 17 to a temperature higher than that of the glass at the other side of the line of separation. That is, for example, as shown in Fig. 3 the hot cutting device may be placed along a line 18, leaving a narrow strip 19 between the two successive positions of the cutting element. Thereupon the glass adjacent the line 18, and particularly the glass along the strip 19, become heated, whereas the glass to the right of the line 17 will remain relatively cooler. Thereupon the area of glass 10 may be readily separated from the area 10′ in the manner above described. With such separation the cellulosic or other binding material along the strip 19 being relatively more plastic, will give way and may be separated from the adjacent areas of glass of the piece 10′, so that the narrow strip of cellulosic material 20 thus removed will adhere to the area of glass 10 as shown in Fig. 4. As above explained, the area 20 of cellulosic material being now freely exposed, may be readily removed or trimmed off by cutting or melting means.

The temperature to which the heated area of glass is subjected may vary between wide limits, depending upon the character and quantity of the cellulosic material and the thickness of glass. However, it is believed to be of greater importance to secure a substantial relative difference of temperature between the heated area and the unheated area as above referred to. That is, although the area at one side of the line of separation has been referred to above as being "unheated", this may be taken to mean relatively unheated, as compared with the hotter area of glass at the other side of the line of separation.

In our above mentioned patent applications, apparatus is disclosed in such form as to be applied to one surface of glass. It will be understood that such apparatus in connection with the present invention may be substantially duplicated, one set of heating elements being applied to each of the two outer surfaces of the laminated glass along the line of separation as indicated in Figs. 1 and 2; in fact it has been found desirable under certain circumstances to use sets of heating elements on the two opposite surfaces of single sheets of glass, as well as laminated glass, to secure rapid and accurate separation of the glass along the desired line.

The above described processes are particularly desirable for use in connection with the cutting of sheets of glass, either single or laminated, of irregular shapes including those with curved as well as straight or angular edges, as for instance automobile windshields or windows of single or laminated glass. Where the process is used in conjunction with electrical heating and cutting means, for cutting single sheets of glass as disclosed in our above mentioned patent applications, the product is particularly desirable for use in the making of laminated glass in that the edges of the glass are free from chips and flaws, which it is believed contribute largely to the breakage of laminated glass, inasmuch as such chips and flaws (as occur with the cutting of glass with diamonds and steel wheels) appear to provide starting points for cracks and shattering when the laminations are subjected to pressure in the processes of assembling, cutting, and/or mounting of the laminated glass.

In Fig. 7 the arrangement of apparatus as indicated in Figs. 1 and 2 is shown as applied in the cutting of a single sheet of plain glass as at 21. The use of electrical cutting means along the top and bottom sides of the line of separation simultaneously, greatly facilitates the accurate cutting of glass, according to this general method, particularly where the glass is of substantial thickness.

It will be understood that after the laminated glass has been cracked along the line of separation, such line of cracked separation serves as an effective insulating barrier between the relatively hot and the cooler areas of the glass, whereby the relative difference of temperature of these two areas may be sharply defined, thus insuring release of the cellulosic material from the section of glass which is trimmed off while the cellulosic material remains in normal condition between the laminations of glass of the area which is being cut to measure.

If desired, the area of glass which has been relatively heated in the above described process, may in part be reclaimed by retrimming the same in a manner similar to the above described process; thereby, for example, a large area of laminated glass may be cut into sections as desired without any waste glass between sections other than a narrow strip, from which the cellulosic material has been wholly or partially removed. This is shown in Fig. 6, a separation of the cellulosic material at the second line of cutting being indicated at 19′, 20′.

Our copending application Ser. No. 373,245, filed June 24, 1929, embodies claims to various features above referred to.

While the invention has been described in detail with respect to certain particular preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. Process of severing laminated glass comprising a plurality of layers of glass between which material for preventing shattering is interposed, which comprises cracking the layers of glass along the desired line of separation and thereafter creating in the glass at one side of said line of separation a temperature different from that of the glass at the other side of the line of separation, whereby one of said areas of glass may be separated from the other without disturbance of the shatter preventing material within said other area.

2. Process of severing laminated glass comprising a plurality of layers of glass between which material for preventing shattering is interposed, which comprises cracking the layers of glass along the desired line of separation by applying electrically heated conductors thereto, and thereafter creating in the glass at one side of said line of separation a temperature different from that of the glass at the other side of the line of separation, whereby one of said areas of glass may be separated from the other without disturbance of the shatter preventing material in one of said areas.

3. Process of severing laminated glass comprising a plurality of layers of glass between which material for preventing shattering is interposed, which comprises cracking the layers of glass along the desired line of separation by applying electrically heated conductors thereto, and thereafter by the use of electrically heated conductors, creating in the glass at one side of said line of separation a temperature different from that of the glass at the other side of the line of separation, whereby one of said areas of glass may be separated from the other without disturbance of the shatter preventing material in one of said areas.

4. Process of severing laminated glass comprising a plurality of layers of glass between which material for preventing shattering is interposed, which comprises substantially simultaneously cracking the layers of glass along the desired line of separation and thereafter creating in the glass at one side of said line of separation a temperature different from that of the glass at the other side of the line of separation, whereby one of said areas of glass may be separated from the other without disturbance of the shatter preventing material in said first named area.

5. Process of severing laminated glass, comprising a plurality of layers of glass between which shatter preventing material is interposed, which comprises dividing the layers of glass along the desired line of separation, and thereafter separating the divided portions by removing from one of said portions a narrow strip of the shatter preventing material, together with the other portion of laminated glass, leaving the shatter preventing material intact between the edges of said last named portion.

6. Process of severing laminated glass comprising a plurality of layers of glass between which shatter preventing material is interposed, which comprises dividing the layers of glass along the desired line of separation and thereafter separating the divided portions by removing from one of said portions a narrow strip of the shatter preventing material, together with the other portion of laminated glass, leaving the shatter preventing material intact between the edges of said last named portion, and thereafter trimming said narrow strip from the edge of said last named portion.

7. Process of cutting laminated glass which comprises cracking the layers of glass along the desired line of separation, releasing the shatter preventing binding material in respect to the glass at one side of said line only, and thereafter separating the severed areas of the glass.

8. Process of cutting laminated glass which comprises cracking the layers of glass along the desired line of separation, releasing the shatter preventing binding material in respect to the glass at one side of said line only and separating the severed areas of the glass, and thereafter trimming away the protruding strip of shatter preventing material from the severed portion of glass at the other side of the line of separation.

In testimony whereof we have signed our names to this specification.

FURMAN N. CAMPBELL.
JULES MYATT.

CERTIFICATE OF CORRECTION.

Patent No. 1,738,229.  Granted December 3, 1929, to

FURMAN N. CAMPBELL ET AL.

It is hereby certified that error appears in the printed specification of the above numbered patent requiring correction as follows: Page 1, after line 33, insert the paragraphs, "The invention consists in such novel features, arrangements, apparatus, methods and products as shown, described, and claimed in connection with the embodiments of the invention herein disclosed by way of example only".

In the drawings, Figs. 1 and 2 indicate somewhat schematically the arrangement of apparatus for applying the invention to the cutting of laminated glass;

Figs. 3, 4 and 5 indicate areas of laminated glass as cut according to the process of the invention;

Fig. 6 is a view similar to Fig. 5, but indicating a piece of laminated glass which has been twice cut along closely adjacent lines; and Fig. 7 indicates the use of the apparatus hereof as applied to the cutting of single sheets of glass.; and that the said Letters Patent should be read with these corrections therein that the same may conform to the record of the case in the Patent Office.

Signed and sealed this 4th day of February, A. D. 1930.

(Seal)

M. J. Moore,
Acting Commissioner of Patents.